Nov. 17, 1959  R. W. SLUDER  2,913,159
TIRE HOLD DOWN DEVICE
Filed Nov. 10, 1953  3 Sheets-Sheet 1

INVENTOR
ROBERT W. SLUDER

INVENTOR
Robert W. Sluder

Nov. 17, 1959 — R. W. SLUDER — 2,913,159
TIRE HOLD DOWN DEVICE
Filed Nov. 10, 1953 — 3 Sheets-Sheet 3

INVENTOR
Robert W. Sluder

BY Holcombe Wetherill & Brisebois
ATTORNEYS

United States Patent Office 2,913,159
Patented Nov. 17, 1959

2,913,159

TIRE HOLD DOWN DEVICE

Robert W. Sluder, Salt Lake City, Utah

Application November 10, 1953, Serial No. 391,237

11 Claims. (Cl. 224—42.23)

This invention relates to holding devices for spare tire and wheel carrying racks of motor vehicles, especially trucks and trailers.

The purpose of this invention is to render more simple the release and removal of the spare tire and wheel assembly and to retain it under a securing pressure which is positively maintained at all times during operation of the motor vehicle.

Heretofore, tires have been mounted by screw nuts and other threaded devices that have a tendency to become loose. Safety features heretofore provided to prevent loss of a tire from spare tire holders are all affected by the continuous vibration to which such vehicles are subjected when travelling over the road and which has heretofore produced a weakening effect upon the brackets and securing means holding the tire to the body.

It is an object of this invention to provide a tire retaining means that is simple in construction, easy to release, requires no additional or special tools to remove, and provides a positive continuous pressure to retain the tire immovably in its position.

My tire hold-down device consists of a fluid-actuated cylinder operating through a linkage to bring a continuous and positive pressure to bear against the wheel on which a spare tire is mounted or against the casing of the tire, and although it is particularly concerned with tires for trucks, trailers and the like, it may be used on any vehicle equipped with a fluid pressure system, for examples compressed air or vacuum.

A device illustrating this invention is shown in the attached drawings, wherein.

Figure 1:
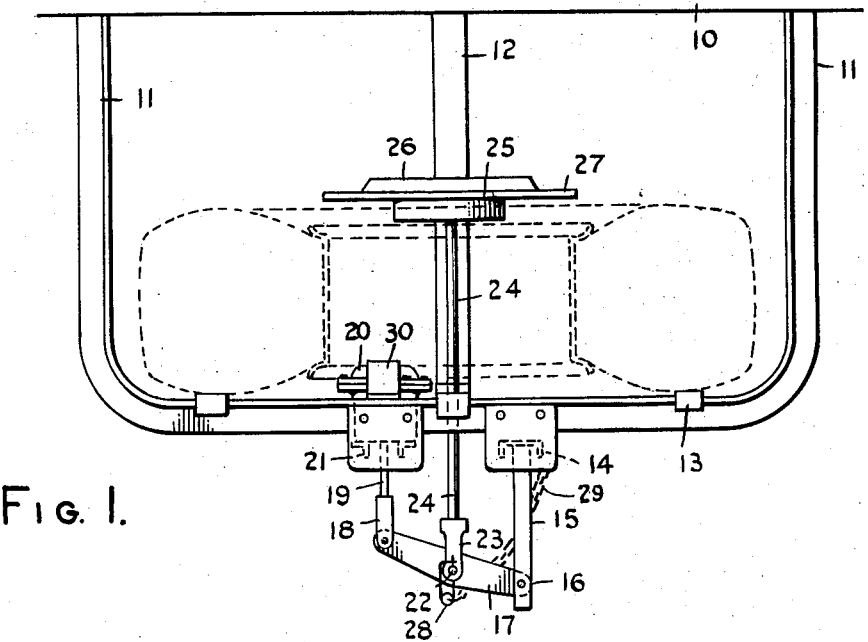
Fig. 1 is a side view of the device mounted beneath a truck or trailer body, showing a spare tire and wheel assembly in dotted lines and the clamping mechanism of the invention in release position.

Referring more particularly to the device illustrated in Figs. 1 to 3 of the drawings, the vehicle body 10 supports a pair of generally parallel U-frames 11 extending below the body and connected by an arm 12 and cross members 13, forming a receptacle for the tire. Also supported beneath the U-frames 11 is a bracket member 14 carrying a vertical post 15 having a stationary pivot 16 near its lower end upon which is mounted one end of a lever 17. The other end of the lever 17 is pivoted to a fork 18 attached to the lower end of a rod 19 operated by an air actuated piston or diaphragm in a chamber 20 which is supported beneath the tire carrier by a suitable bracket member 21 spanning the U-frames. This chamber is of the usual type and may be operated on either compressed air or vacuum to raise and lower the free end of the lever 17. Pivoted on a removable pivot 22, held in place by the safety pin 28 approximately at the mid point of the lever 17, is an adjustable forked coupling 23 having a threaded portion at its upper end into which is screwed the lower end of an adjustable rod 24. The threaded portion of this rod provides for sufficient adjustment in height to allow for tires of varying thicknesses and its upper end is fastened to a pilot ring 25 across the top of which extends a cross bar 27 for engaging the tire to be secured. The pilot ring 25 fits within the bore of the wheel center and the cross bar 27 with the strong back 26, contacts the edge of the rim when clamped in tire retaining position. This arrangement does not produce any direct pressure on the rubber tire by any of the moving parts, and centers and holds the rim and tire in place against the body rests 13, thus preventing the tire from shifting sidewise or vibrating as long as the air pressure in the chamber 20 forces the rod 19 downwardly.

A bar 30, extending over the pneumatic actuating cylinder 20 and secured, as by welding, to the U-frames 11 (see particularly Fig. 2), serves to protect such cylinder 20 from damage by the spare tire assembly as the latter is being placed in and removed from the carrier.

Figure 5:
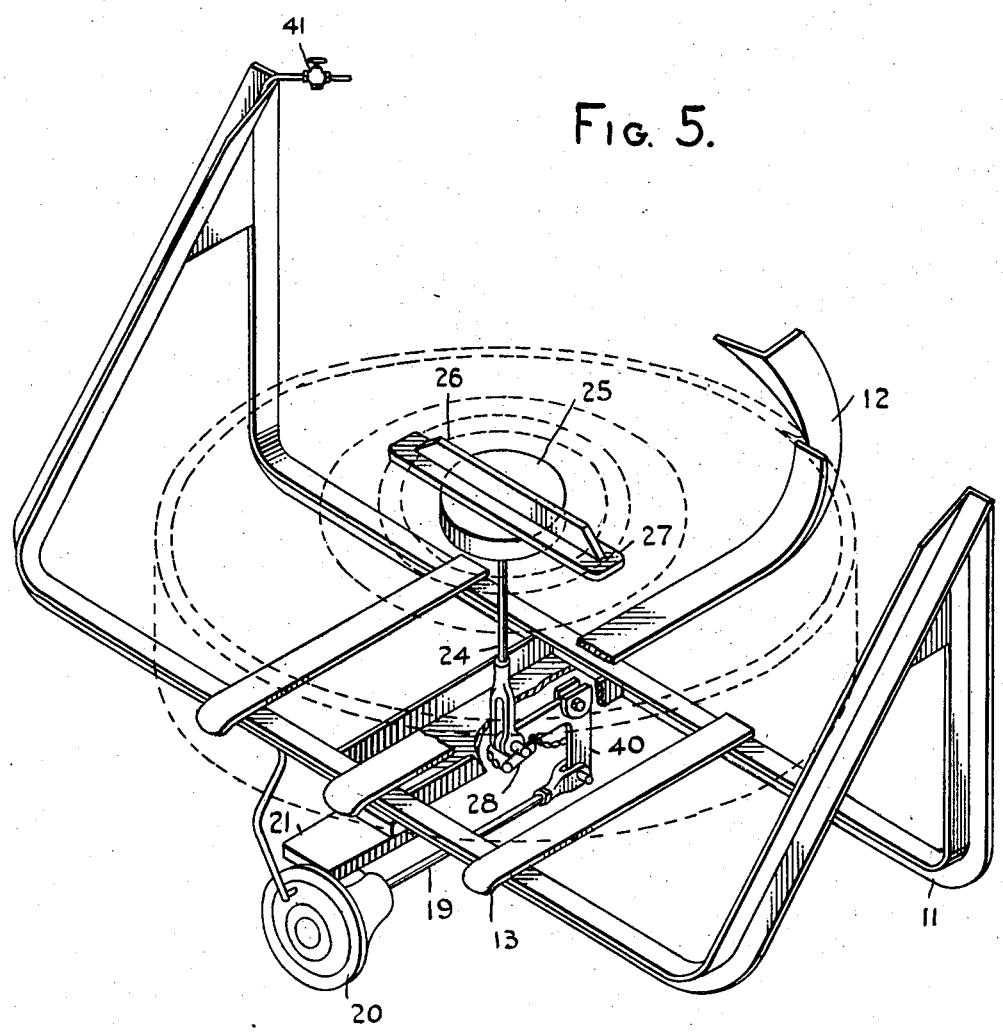
Fig. 5 is a similar view of a modification of the embodiment of Fig. 1.

A modification of the above device is shown in Fig. 5, wherein the cylinder 20 is mounted on the bracket member 21 and operates a piston rod 19 which moves the pivoted bell crank 40, whose lever arms are at right angles to each other, so as to actuate the adjustable rod 24 and hold the tire retaining means 25 and its cross bar 27 against the wheel and the rim. This construction has the advantage that the pivoted lever 40 does not protrude as far below the U-frame 11 as does the device shown in Fig. 1 and is therefore not subject to accidental damage.

When it is desired to remove the spare time from the tire carrier, the air is cut off by means of a valve 41, shown in Fig. 5, which allows the piston rod 19 to move into a released position, and the lever 17 moving therewith raises the rod 24 and allows the removal of the pivot pin 22 from the coupling 23, which latter may then be removed from the lever 17 and raised through the tire so that the same may be removed from the carrier. Both the removable pivots 22 and the safety pin 28 are attached by chains 29 to prevent loss.

When it is desired to secure a tire in place within the carrier, the rod 24 with the attached ring 25 and cross bar 27, is inserted through the hub opening and reattached at the lever 17. The chamber is then actuated by opening the valve 41 which forces the piston rod 19 into an actuated position and brings the required tension to bear upon the tire and wheel assembly.

Figure 2:
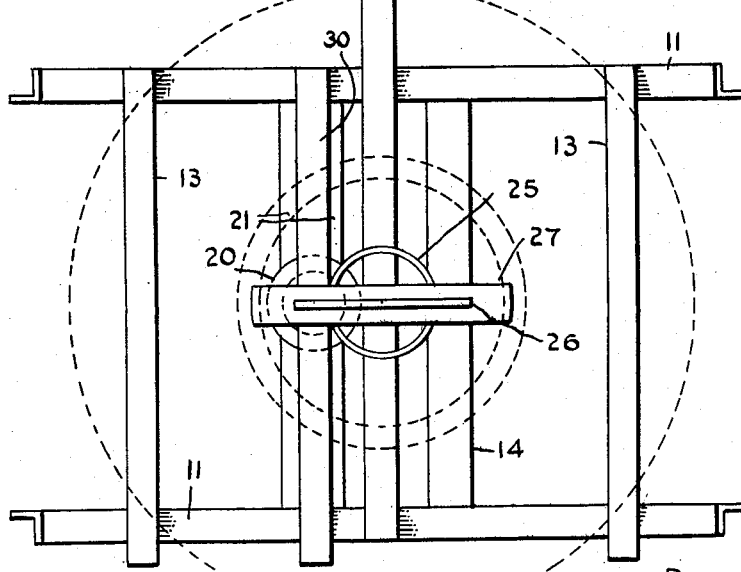
Fig. 2 is a plan view of the same.
Figure 3:
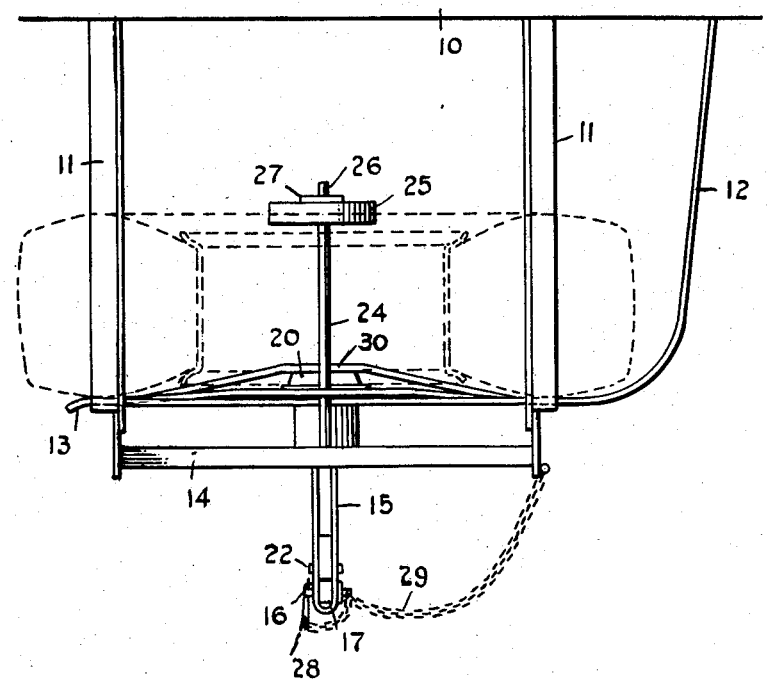
Fig. 3 is a side view taken at right angles to Fig. 1, looking at the right side thereof.
Figure 4:
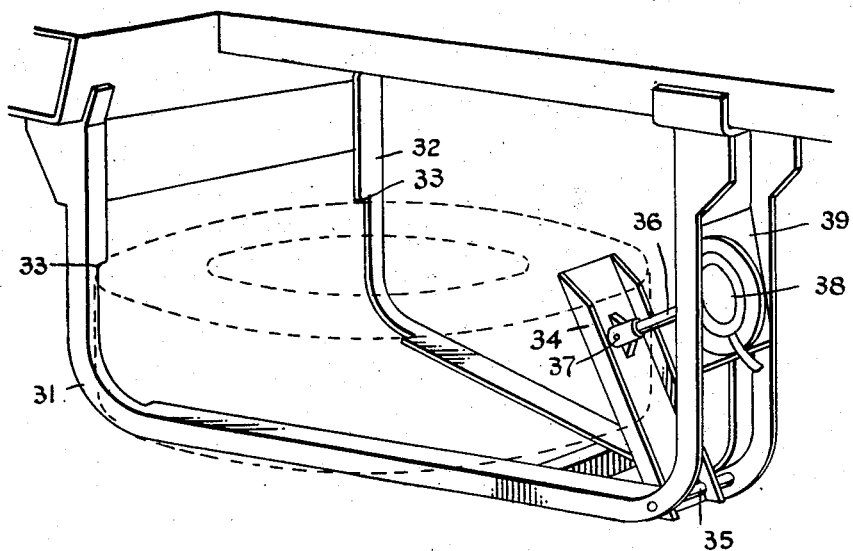
Fig. 4 is a perspective view of another embodiment of this invention, showing the tire in dotted lines.

Another embodiment of this invention is shown in Fig. 4, wherein the tire and wheel assembly is slid laterally into the carrier in the same manner as with the device of Figs. 1 and 2. Such assembly is then forced sidewise against the U-frames 31 and 32 and within notches 33 thereof, by means of a pivoted shoe 34. This shoe is mounted on a pivot 35 and is actuated by the piston rod 36 operating through the adjustable pivot member 37. The piston chamber 38 is rigidly attached to the U-frames 31 and 32 by a suitable bracket 39 and is operated by air pressure controlled by means of a valve similar to that shown in Fig. 5.

The construction illustrated in Figure 4 has an advantage over those of Figs. 1 and 5 in that there is nothing protruding below the spare tire receptable which may be damaged by contact with obstructions or obstacles on the road. The working mechanism is entirely housed within the confines of the frames, and is thereby protected from accidental injury.

Experience shows that this device is a great improvement in holding spare tire or spare wheel assemblies for trucks or for passenger vehicles over mechanical devices heretofore available. Both vibration and noise are eliminated by the constant holding means that produces a positive even pressure against the metal parts of the wheel without chafing or breaking the side wall of the tire, and at the same time positively prevents its shifting during operation of the vehicle.

What is claimed is:

1. A spare tire retaining means for attachment to automotive vehicles equipped with a system for supplying fluid under pressure, comprising a horizontal support for a tire and wheel assembly, a fluid-operated piston, a lever pivotally connected on said support and at one end to said piston, a rod connected at its lower end to said lever for actuation thereby, said rod extending through the tire wheel assembly, means at the upper end of said rod to contact the tire and wheel assembly, and means for connecting said fluid-operated piston in pressure-fluid-supply relationship with said fluid supplying system during operation of the vehicle.

2. A spare tire retaining means as set forth in claim 1, wherein means are provided detachably connecting the rod and the tire and wheel assembly contacting means to the pivoted lever, to provide for removal of the tire and wheel assembly.

3. A spare tire retaining means as set forth in claim 2, wherein means are provided for adjusting the detachable connecting means, to adapt said device to different sizes of tires.

4. In an automotive vehicle equipped with a system for supplying fluid under pressure, the combination, with said system, of a spare tire retaining device comprising a tire-supporting rack secured to said vehicle; clamping means operable in opposition to a tire-supporting surface of the rack for securing a tire in the latter, said clamping means including a clamping jaw, a lever disposed adjacent said surface of the rack and having a power arm and a work arm, means fulcruming said lever to the rack, and a connecting rod linking said clamping jaw to the work arm of the lever in spaced, spare-tire-receiving relationship with said surface of the rack; fluid-operated means connected to the power arm of the lever, for actuating the latter; and means for connecting said fluid-operated means in pressure-fluid-supply relationship with said fluid supplying system during operation of the vehicle.

5. The combination of claim 4, wherein the lever is a bell crank pivotally fulcrumed to the rack intermediate its power arm and its work arm.

6. The combination of claim 5, wherein the rack is horizontally disposed and the said tire-supporting surface thereof is superficial thereto; wherein the bell crank is disposed in a vertical plane with the work end of its work arm disposed substantially centrally of said surface; wherein the fulcruming means pivotally attaches said bell crank to the rack below said surface, for movement on a horizontal axis; wherein the connecting rod extends upwardly through the rack substantially centrally of said surface; and wherein the clamping jaw is an elongate cross-piece at the upper end of said rod.

7. The combination of claim 6, wherein a removable pivot pin connects the lower end of the connecting rod to the work end of the work arm of the bell crank, and means are provided for normally securing said pivot pin in place.

8. The combination of claim 7, wherein the lower end portion of the connecting rod is longitudinally extensible and retractable relative to the remainder of said rod, to afford length adjustment.

9. A spare tire retaining means for attachment to automotive vehicles equipped with a system for supplying fluid under pressure, comprising a support for a spare tire; a shoe pivoted at one of its ends to said support and arranged to swing into spare-tire-clamping position; an actuating rod pivotally connected to said shoe adjacent the other end thereof; fluid pressure-responsive means operatively associated with said rod for moving it longitudinally; and means connectable to said fluid supplying system of the automotive vehicle for supplying fluid under pressure to said pressure-responsive means during operation of said vehicle.

10. In an automotive vehicle equipped with a spare-tire-carrying rack and a system for supplying fluid under pressure, the combination, with said rack and said system, of tire-clamping means positioned in tire-clamping relationship to said rack; fluid-operated means for actuating said clamping means; and means connecting said fluid-operated means in pressure-fluid-supply relationship with said system during operation of the vehicle.

11. A spare tire carrier for attachment to automotive vehicles equipped with a system for supplying fluid under pressure, comprising a tire-carrying rack provided with means adapting it for attachment to an automotive vehicle; tire-clamping means positioned in tire-clamping relationship to said rack; fluid-operated means for actuating said clamping means; and means for connecting said fluid-operated means in pressure-fluid-supply relationship with said system during operation of the vehicle.

References Cited in the file of this patent

UNITED STATES PATENTS

| | | |
|---|---|---|
| 941,543 | Sistek et al. | Nov. 30, 1909 |
| 1,797,222 | Alborn et al. | Mar. 24, 1931 |
| 1,947,820 | Alborn | Feb. 20, 1934 |
| 2,065,644 | Bristol | Dec. 29, 1936 |
| 2,420,854 | Black | May 20, 1947 |
| 2,530,572 | Eckles | Nov. 21, 1950 |
| 2,541,659 | McGovern | Feb. 13, 1951 |
| 2,589,771 | Campbell et al. | Mar. 18, 1952 |